V. H. CHRISTEN.
U-CLIP FOR WINDSHIELD WIPERS.
APPLICATION FILED JUNE 23, 1920.
1,369,008.
Patented Feb. 22, 1921.
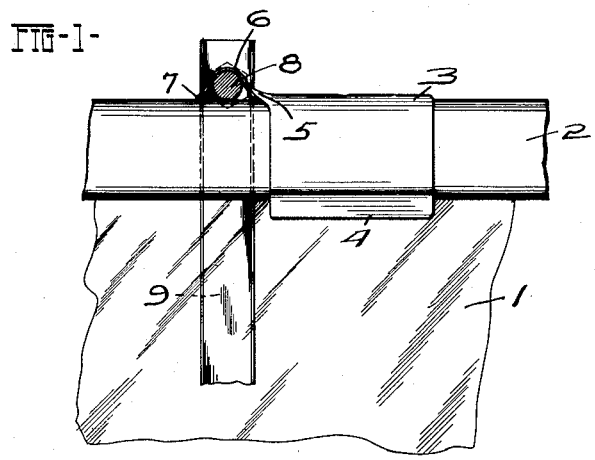
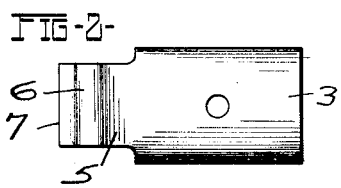
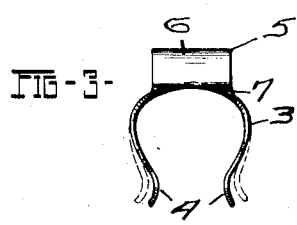
INVENTOR
Victor H. Christen
by
Owen, Owen & Crampton

UNITED STATES PATENT OFFICE.

VICTOR H. CHRISTEN, OF TOLEDO, OHIO.

U-CLIP FOR WINDSHIELD-WIPERS.

1,369,008.                     Specification of Letters Patent.    Patented Feb. 22, 1921.

Application filed June 23, 1920. Serial No. 391,211.

*To all whom it may concern:*

Be it known that I, VICTOR H. CHRISTEN, a citizen of the United States, and a resident of Toledo, in the county of Lucas and State of Ohio, have made an invention appertaining to U-Clips for Windshield-Wipers; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a clip for readily securing wipers to automobile frames at any point or part of the frame. Constructions containing my invention are formed of elastic material that will not only conform to wind shield frames of different sizes and shape, but will also by their elasticity, tightly clamp the wind shield frame.

Constructions containing my invention may partake of different forms and to illustrate a practical application of the invention I have selected a structure containing the invention as an example and shall describe it hereinafter. The structure selected is illustrated in the accompanying drawings.

Figure 1 of the drawings illustrates the clip in position on the frame of a wind shield. Fig. 2 illustrates a top view of the clip, and Fig. 3 illustrates an end view of the clip.

1 is the wind shield. 2 is the frame on which the clip 3 is placed. The clip 3 is formed of spring sheet metal into a U having a length considerably broader than the width of the U, as shown in Fig. 2. The upper portion of the sides and the top of the U clip is preferably substantially cylindrical while the lower portions of the sides or legs of the U clip change from the cylindrical to form outward flaring portions 4. The clip 3, being formed of spring sheet metal, can be placed over the top of the frame 2 and with a light blow or with pressure, it will be snapped down into position onto the frame, which may be also substantially cylindrical, and, by the elasticity of the sides of the U-shaped clip, the clip 3 will be securely held in position. Also by reason of the elasticity of the metal of which the clip is formed it will conform to frames of different sizes and shapes as to cross sections of the frame part. Thus the clip may be used for securing wipers to a great variety of makes of automobiles or automobile wind shields.

The clip is provided with a tongue 5 that extends from the top of the clip and has a length substantially the same as the thickness of the frame. The tongue 5 extends upward from the clip and the metal is so bent and shaped in order that it may change from the relatively large cylindrical shape of the clip body to a relative small cylindrical shape 6 extending at right angles to the cylindrical shape of the top portion of the clip body. The tongue terminates in an outward flaring portion 7 which causes the tongue to elastically contact with the frame and enables the tongue to expand and to tightly contact with the top of the frame when the clip 3 is forced in position on the frame. The clip may be used for connecting a great variety of wipers to the wind shield. The wipers are commonly provided with a pin 8 that connects the wiper edge with a handle located on the interior of the automobile or with a second wiper which is also located on the interior of the automobile. The wiper 9 is so placed that the pin 8 extends across the top of the frame and the clip 3 is so positioned that the cylindrical portion 6 will be placed above the pin 8 and by pressure or by a light blow the clip 3 will be forced into position on the frame and at the same time the pin 8 will be located within the cylindrical portion 6 and elastically held in position thereby.

The invention thus provides an efficient means for connecting wipers of different forms to wind shield frames likewise of different forms and shapes and of different manufacture.

I claim:—

1. In a clip for securing wipers to wind shield frames, a U-shaped member formed of spring sheet metal, the legs of the U being elastic and having a portion that conforms to the shape of the frame, the lower edges of the U having flaring portions, the sheet metal U-member having a tongue member having a cylindrical portion located above the U-shaped body portion of the clip and extending transverse to the U-shaped portion of the clip for confining the cross pin of the wiper within the said cylindrical portion.

2. In a clip for securing a wiper to an automobile wind shield frame, formed of spring sheet metal and having a length greater than the width of the U-shaped portion, the legs of the U terminating in flaring flanges, the U-shaped portion having a tongue bent to form a cylindrical portion located above the U-shaped portion and extending at right angles to the U-shaped portion and terminating in a flaring edge located in contact with the wind shield frame for securing the wiper within the said cylindrical portion.

In testimony whereof I have hereunto signed my name to this specification.

VICTOR H. CHRISTEN.